US010424106B1

(12) United States Patent
Glazer

(10) Patent No.: US 10,424,106 B1
(45) Date of Patent: Sep. 24, 2019

(54) SCALABLE COMPUTER IMAGE SYNTHESIS

(71) Applicant: Steven Scott Glazer, Portland, OR (US)

(72) Inventor: Steven Scott Glazer, Portland, OR (US)

( * ) Notice: Subject to any disclaimer, the term of this patent is extended or adjusted under 35 U.S.C. 154(b) by 13 days.

(21) Appl. No.: 15/917,237

(22) Filed: Mar. 9, 2018

(51) Int. Cl.
*G06T 15/20* (2011.01)
*G06T 13/20* (2011.01)
*G06T 19/20* (2011.01)
*G06T 17/05* (2011.01)

(52) U.S. Cl.
CPC .......... *G06T 15/205* (2013.01); *G06T 13/20* (2013.01); *G06T 17/05* (2013.01); *G06T 19/20* (2013.01); *G06T 2200/04* (2013.01)

(58) Field of Classification Search
CPC ....... G06T 15/205; G06T 17/05; G06T 19/20; G06T 13/20; G06T 2200/04
See application file for complete search history.

(56) References Cited

U.S. PATENT DOCUMENTS

2006/0274065 A1* 12/2006 Buyanovskiy .......... G06T 15/06 345/424

OTHER PUBLICATIONS

Carpenter, Loren, "The A-buffer, an antialiased hidden surface method", SIGGRAPH '84 Proceedings of the 11th annual conference on Computer graphics and interactive techniques, pp. 103-108, ACM, New York, NY (Year: 1984).*
Djeu, Peter, et al., "Accelerating Shadow Rays Using Volumetric Occluders and Modified kd-Tree Traversal", HPG '09 Proceedings of the Conference on High Performance Graphics 2009, pp. 69-76, ACM, New York, NY (Year: 2009).*

* cited by examiner

*Primary Examiner* — William A Beutel
(74) *Attorney, Agent, or Firm* — Schwabe Williamson & Wyatt, P.C.

(57) ABSTRACT

In some embodiments, a memory may store programming for selecting values describing a frame of pixels by modeling, based on camera data, object data, and material data, a geometric projection of light in a visual simulation, the modeling including identifying voxel data and building a voxel tree from the voxel data. A processor may, responsive to executing the programming, invoke one or more of a clipping module to generate a portion of the voxel data, a depth occlusion module to check for spatial visibility of one or more outputs of the clipping module and generate an output including one or more layers of a voxel tree, a re-projection module to conditionally generate a re-projection layer of the voxel tree, and an aggregation module to aggregate data of a final layer of the voxel tree with preceding layers to select an individual one of the values. Other embodiments may be disclosed and/or claimed.

10 Claims, 20 Drawing Sheets

Voxel Tree 302

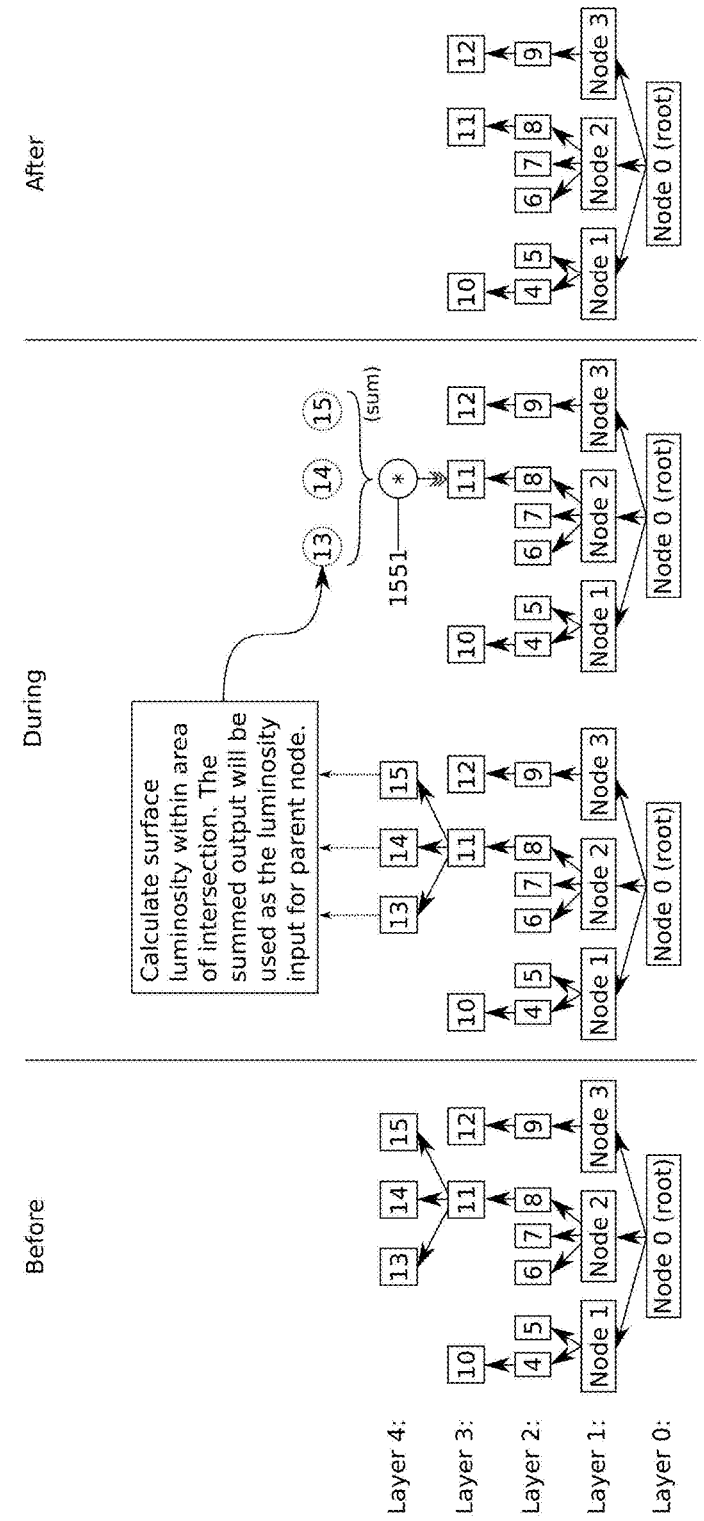

Inventor: Steven Scott Glazer
Docket No. 129754-222044
16/20

/// Main function.

```
function ComputeFrame(    frame_structure *frame,
                          input_structure *input)
{
    /// Repeat for all pixels in current frame.
    for
        pixel_index = 0 ;
        pixel_index < frame->pixel_count ;
        pixel_index++
    {
        /// Repeat for all voxels in current pixel.
        for
            voxel_index = 0 ;
            voxel_index < frame->pixel_list[pixel_index]->voxel_count ;
            voxel_index++
        {
            /// Project current voxel against input triangles.
1601 ──▶    ProcessVoxel(   frame->pixel_list[pixel_index]->voxel_list[voxel_index],
                            input,
                            input->recursion_count);
        }

/// Process voxel tree, propagate calculated luminosity toward root, and store final value in frame.
1602 ──▶ SolvePixel(    frame->pixel_list[pixel_index],
                        frame->bitmap[pixel_index]);
    }

/// Frame data is rasterized as pixel values in frame->bitmap.
1603 ──▶ DisplayBitmap(    frame->bitmap);
}
```

Inventor: Steven Scott Glazer
Docket No. 129754-222044
17/20

```
/// Project the voxel, intersect with each object in the list, and append any intersected object data to voxel_list.

function ProcessVoxel(    voxel *current_voxel,
                          input_structure *input,
                          int recursion_count)
{

/// If recursion count has been decremented below zero, do nothing and return.

if (recursion_count < 0)
      return;

if IsProcessed(    current_voxel)
   {

/// This node has been processed.

/// Repeat for all children in current_voxel.
      for
         child_index = 0 ;
         child_index < current_voxel->child_list.size ;
         child_index++
      {

/// Recursively process children.  Depth specified by decrementing recursion_count.
         ProcessVoxel( current_voxel->child_list[child_index],
                       input,
                       recursion_count - 1);

}

}
   else
   {

/// Current voxel is not processed.

voxel *temporary_voxel_list;

/// Repeat for all objects in input data.
      for
         triangle_index = 0;
         triangle_index < object_list.size ;
         triangle_index++
      {
```

```
/// Project current voxel against current object and store any non-null data in output list.
ClipTriangleToVoxel(current_voxel,
                    input->triangle_list[triangle_index],
                    temporary_voxel_list);

}

/// Current voxel has been projected against all triangles.  Intermediate results are stored in
temporary_voxel_list.

/// Perform depth occlusion on temporary voxel set, and append depth occluded results to
current_voxel as children.
        OccludeVoxels( temporary_voxel_list,
                       current_voxel);

if (recursion_count > 0)
    {

/// Repeat for all child nodes in current voxel.
        for
                child_index = 0 ;
                child_index < current_voxel->child_list.size ;
                child_index++
        {

/// Compute a new voxel layer using the current voxel layer and the material data associated
with the intersection.
            PropagateVoxel( current_voxel);

}

}

}

/// Current voxel has been projected and depth occluded.  The data has been appended to the
structure provided to this function.  Return to calling routine.

Inventor: Steven Scott Glazer
Docket No. 129754-222044
19/20

/// Solve pixel value by calling recursive function on the root of the voxel tree. Store result in pixel_value.

```
function SolvePixel( pixel *current_pixel,
                     value *pixel_value)
{
    /// Process voxels in current_pixel, calculate luminosity value, and store this value as bitmap data in
    pixel_value.

value *luminosity;

/// Repeat for all children connected to this pixel.
    for
        child_index = 0 ;
        child_index < current_pixel->child_list.size ;
        child_index++
    {
```

1611 ⟶ PropagateLuminosity( current_pixel->child_list[child_index],
                                luminosity);

```
    }

SetPixel( luminosity,
              pixel_value);

Inventor: Steven Scott Glazer
Docket No. 129754-222044
20/20

```
/// Recursively traverse voxel tree, accumulate luminosity, propagate to parent node, modify by
material properties, and merge with total.

function PropagateLuminosity(    voxel *current_voxel,
                                 value *luminosity)
{
    value *temporary_luminosity;

/// Repeat for all children of this node.
    for
        child_index = 0 ;
        child_index < current_voxel->child_list.size ;
        child_index++
    {
        PropagateLuminosity(  current_voxel->child_list[child_index],
                              temporary_luminosity);
    } value area = SolveArea(current_voxel);

/// Solve the luminosity of the surface within the current voxel.
    /// Multiply the result of this by the area of the surface within the voxel, and store the value in
luminosity.

luminosity = area * SolveLuminosity(  current_voxel,
                                          temporary_luminosity);
}
```

SCALABLE COMPUTER IMAGE SYNTHESIS

COPYRIGHT NOTICE

© 2018 Steven Scott Glazer. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

Embodiments of the present disclosure relate to the field of rendering computer graphics (e.g., image synthesis), and in particular, to methods and apparatuses associated with scalable computer image synthesis.

BACKGROUND

Some applications utilizing computer image synthesis, such as film production, may demand "photo-realistic" frames of animations. Software for such applications may utilize "ray casting" to simulate the individual transport of rays of light in a model of real three-dimensional (3D) space. Such software may enable simulating effects such as reflection, refraction, caustics, sub-surface scatting, and other properties of physics and reality.

In ray-casting, a computer may trace lines, originating at a virtual camera or at light sources or both, and cast them throughout the 3D model scene. The computer may apply linear algebraic operations to solve intersections between each line and each polygon of objects in the scene. Each intersection may result in the computer casting another layer of rays from the intersected position in new directions, as dictated by the material properties associated with each polygon's "texture." To produce high quality results, these processes can be extremely resource-intensive for the computer, requiring hours or even days to be spent synthesizing images for individual frames of a modern film with computer animation (e.g., "rendering").

Other applications, such as real-time interactive applications (e.g., CAD/3D modeling, imaging, games, virtual reality, etc.) may utilize matrix projection to generate an image (e.g. rasterizing pixels from lines drawn between projected points). Using matrix projection, a computer may transform an object, mesh, or scene by specific characteristics linked to physical camera transformations (e.g., position, rotation, scale, field of view, etc.) and express these transformations mathematically as a matrix (e.g. for 3D matrix projection, transformations such as translate, rotate, and scale can be encoded into a single 4×4 matrix.). Real-time rasterization using matrix projection is different from ray casting and is generally quick enough to generate pixels based on camera-relative point data (used to draw lines and shade triangles), but imagery generated may suffer from artifacts (e.g. "aliasing") and sampling bias (e.g. "moire") and require additional computational overhead in post-processing operations (e.g., lens warp, depth of field, programmable effects, etc.) to address artifacts or improve sampling. Dedicated hardware may be used in the computer (or processing resources of the computer may be allocated, as available) to attempt to compensate for these image artifacts and/or to perform additional processing, but these processing resources may raise costs of producing and/or operating the computer (costs may be in terms of producing the dedicated hardware, opportunity costs of committing processing resources to image quality over using those resources for other tasks, or the like, or combinations thereof). Furthermore, the methods used to minimize artifacts and/or improve the aesthetic quality of an image may not address the underlying cause of the artifact, replacing one inaccuracy with another (less noticeable) inaccuracy.

SUMMARY OF THE EMBODIMENTS

In some embodiments, a computer may include programming for scalable computer image synthesis. The computer may select a value for a pixel by calculating geometric projection of light transport in visual simulations, which may be a highly scalable approach that may be used for a range of applications such as those that demand photo realistic images as well as those that demand real-time image generation. For instance, in some applications the computer may generate images based on deferred pixel value selection for photo-realistic frames of animation in an application such as a film. In other applications, such as interactive media and games, the computer may generate images based on pixel value selection in real-time.

In some embodiments, the computer may cast (or project) a series of volumes into a model of three dimensional space, iterate propagation of volumes by re-casting volume-polygon intersections (according to material properties of the intersected polygons), and associate one or more volumes with each pixel in a frame of animation. The computer may "solve" each pixel (e.g., select the value for the pixel) by generating and then "collapsing" (iteratively reducing to a single accumulated value) a tree of volumetric intersections from the "camera" (defined by a series of vectors that represent the corners of its pixels) through each subsequent "bounce" of volumes cast into the model of three dimensional space, and terminating naturally or at an arbitrary time or recursion depth. The computer may deterministically solve each pixel's value definitively using geometry instead of filtering through an exponential mass of samples toward some convergent result (e.g. unbiased sampling, sampling based on importance or stochastic distribution, etc.).

Unlike existing computer image synthesis methods (which may focus on casting individual rays into a model of three dimensional space), the computer may completely solve the complete intersected area between volumes and object polygons in a single step, whereas other systems for computer image synthesis select pixel value by casting a myriad of lines and converging as many samples as possible toward an asymptotic result. This highly scalable approach may be used to generate higher quality images faster, and potentially in real-time if desired. Accordingly, the matrix projection and rasterization schemes used for some real-time applications may not be needed and, as such, image artifacts caused by rasterization (e.g., aliasing, moire, etc.) may be avoided. Without the performance cost of mitigating these types of artifacts, hardware employing scalable computer image synthesis may reallocate these resource costs previously dedicated to improving the perceived quality of a limited design (e.g., anti-aliasing, texture filtering, and other "image quality" issues) toward improving the performance and efficiency of this new and improved method. The computer may utilize procedural definitions for generating surfaces, describing material interaction properties, and implementing other spatial manipulations that can be used to create effects not possible in traditional systems.

BRIEF DESCRIPTION OF THE DRAWINGS

FIG. 15 is a flow chart illustrating collapsing the deepest layer of a voxel tree that may be performed for each layer of a voxel tree output (such as that of FIG. 6), in some embodiments.

FIG. 16A is pseudocode of a main function that may be used in some embodiments of scalable computer image synthesis.

FIGS. 16B-C is pseudocode of voxel processing functions called by the main function of the pseudocode of FIG. 16A.

FIG. 16D is pseudocode of a pixel solving function called by the main function of the pseudocode of FIG. 16A.

FIG. 16E is pseudocode of a recursive function initially called by the pixel solving function of the pseudocode of FIG. 16D.

DETAILED DESCRIPTION OF PREFERRED EMBODIMENTS

Figure 1:
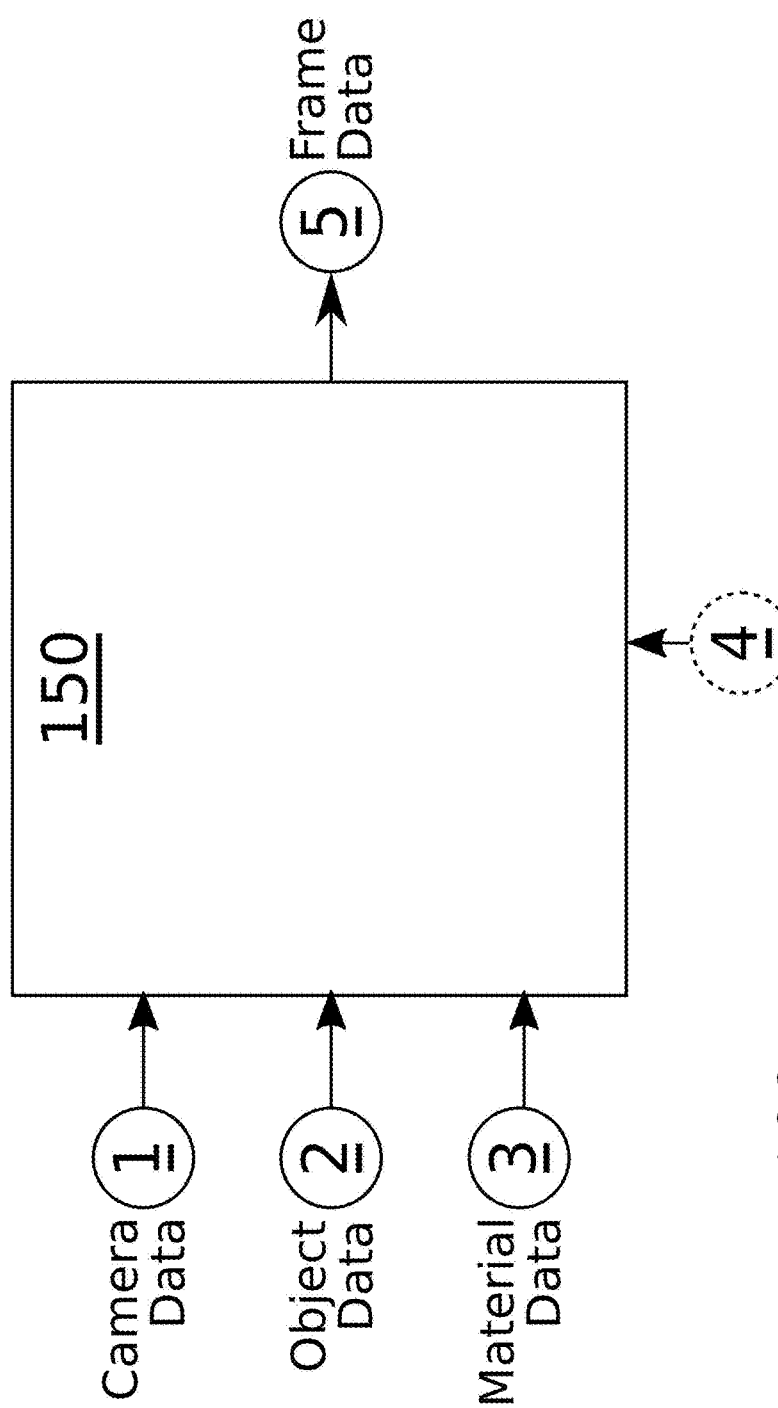
FIG. 1 illustrates a system for scalable computer image synthesis, in some embodiments.

FIG. 1 illustrates a system 100 for scalable computer image synthesis, in some embodiments. The system 100 includes a computing device 150, which may be circuitry such as a processor to execute instructions for scalable compute image synthesis. In other examples, a system may include any circuitry such as scalable computer image synthesis logic, a processor, or the like, or combinations thereof.

The computing device 150 may generate frame data 5 including a series of pixels (e.g., RGB pixels, with red, green, and blue color data, RGBA pixels, where "A" is "alpha" or transparency data, or any other arbitrary pixel format) from an input. In some embodiments, the input may include camera data 1, object data 2, and material data 3.

Figure 2:
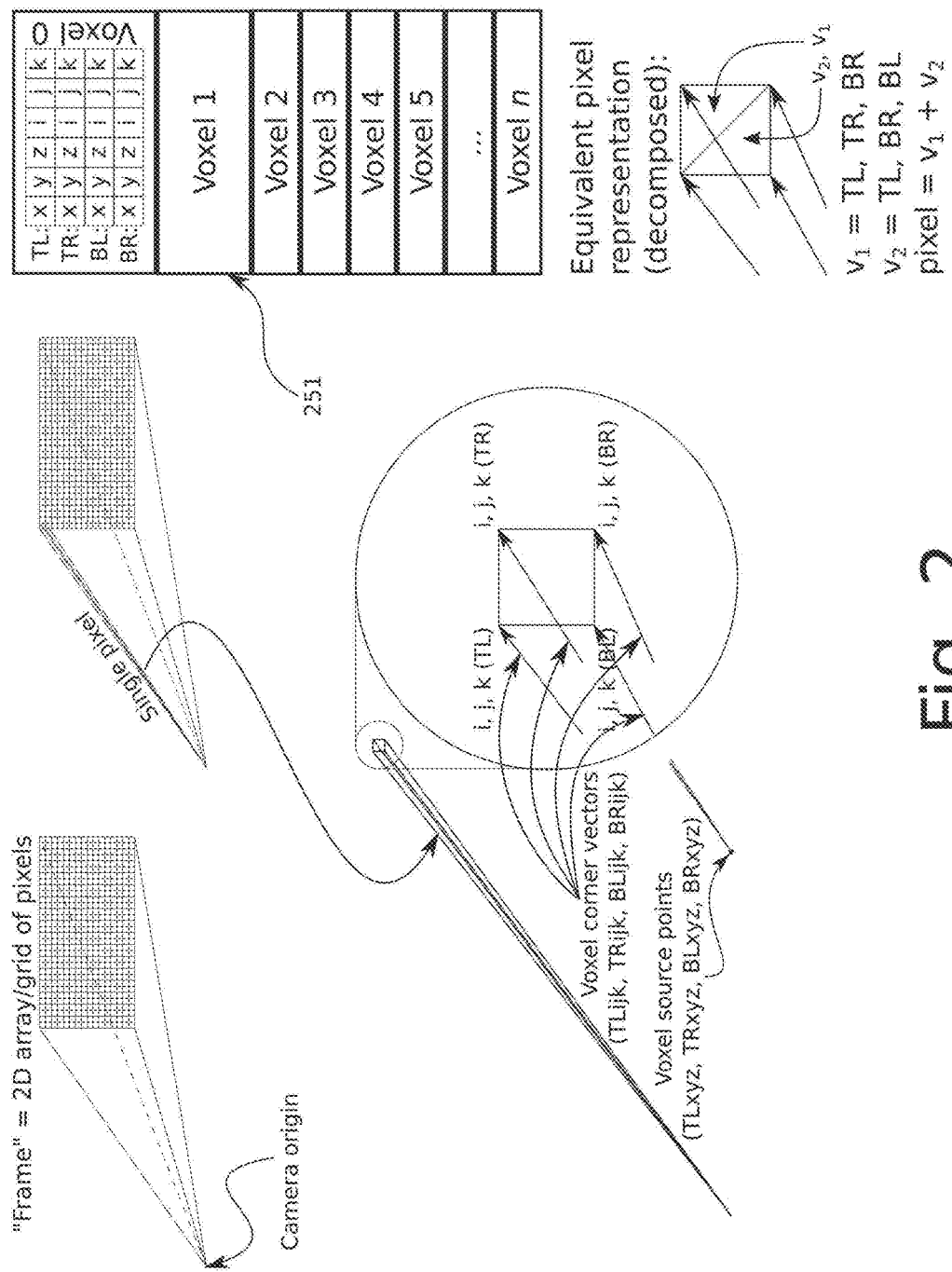
FIG. 2 is a block diagram illustrating an example of voxels (volume elements) that may be used in scalable compute image synthesis, in some embodiments.

As illustrated in FIG. 2, the 2D frame associates camera data 1 input with frame data 5 output as a one-to-one relationship between input camera pixels and output frame pixels. The frame includes one or more pixels, usually arranged in a rectangular grid. Each pixel in the frame may be represented by one or more voxels. Each voxel may have three or more sides. Any voxel with more than three sides may be trivially decomposed into two or more voxels that comprise an equivalent space.

The camera data 1 may include vector data (e.g., one XYZ point and one relative IJK direction, two XYZ points as source and destination, or other equivalent representation.) for each corner of each pixel in the frame to be rendered. In some examples, the camera data may include four vectors for each rectangular pixel (e.g., top left, top right, bottom left, and bottom right corners) in the image frame. Because any convex n-gon (e.g., a polygon with n sides) with sides greater than three (e.g., triangle, quadrilateral, pentagon, and so on.) can be represented by a trivial combination of triangles (e.g., square ABCD is composed of triangles ABC and ABD, pentagon ABCDE is composed of triangles ABC, ACD, and ADE, and so on.), and the total luminosity of a square pixel may be represented as a summation of luminosity values computed from two triangular sub-pixels that constitute an equivalent representation. In common examples of camera data 1 where the camera is taken to be a point, all of the initial vectors of projection may have the same XYZ position, with their IJK components indicating the projected direction of each corner of the each pixel of the camera. In other examples of camera data 1, the vectors may not converge at the same point, thus each corner may have a distinct XYZ position in addition to its IJK direction. The vectors need not converge at all, but their XYZ positions are taken to be the source of the camera's projection. In some examples, the XYZ positions of each camera vector may be arranged in a planar grid, so as to resemble the physical arrangement of photo-sensitive elements in a digital camera sensor (e.g. CMOS, CCD, etc.).

Again referring to FIG. 2, the camera data 1 may include some set of inputs used to generate voxel data. Additionally, one or more camera vectors may be shared between one or more voxels (e.g., in an embodiment using a point-based camera, all x, y, z source points may be identical, but in other embodiments, pixel vectors may have entirely distinct components). In some cases, pixels may share corner vectors; in other cases distinct vectors may cause the voxels to overlap (contain common space) or remain isolated (not overlap other voxels). How the vectors of a voxel are arranged may contribute to light field effects such as focus, depth of field, and so on.

Figure 3:
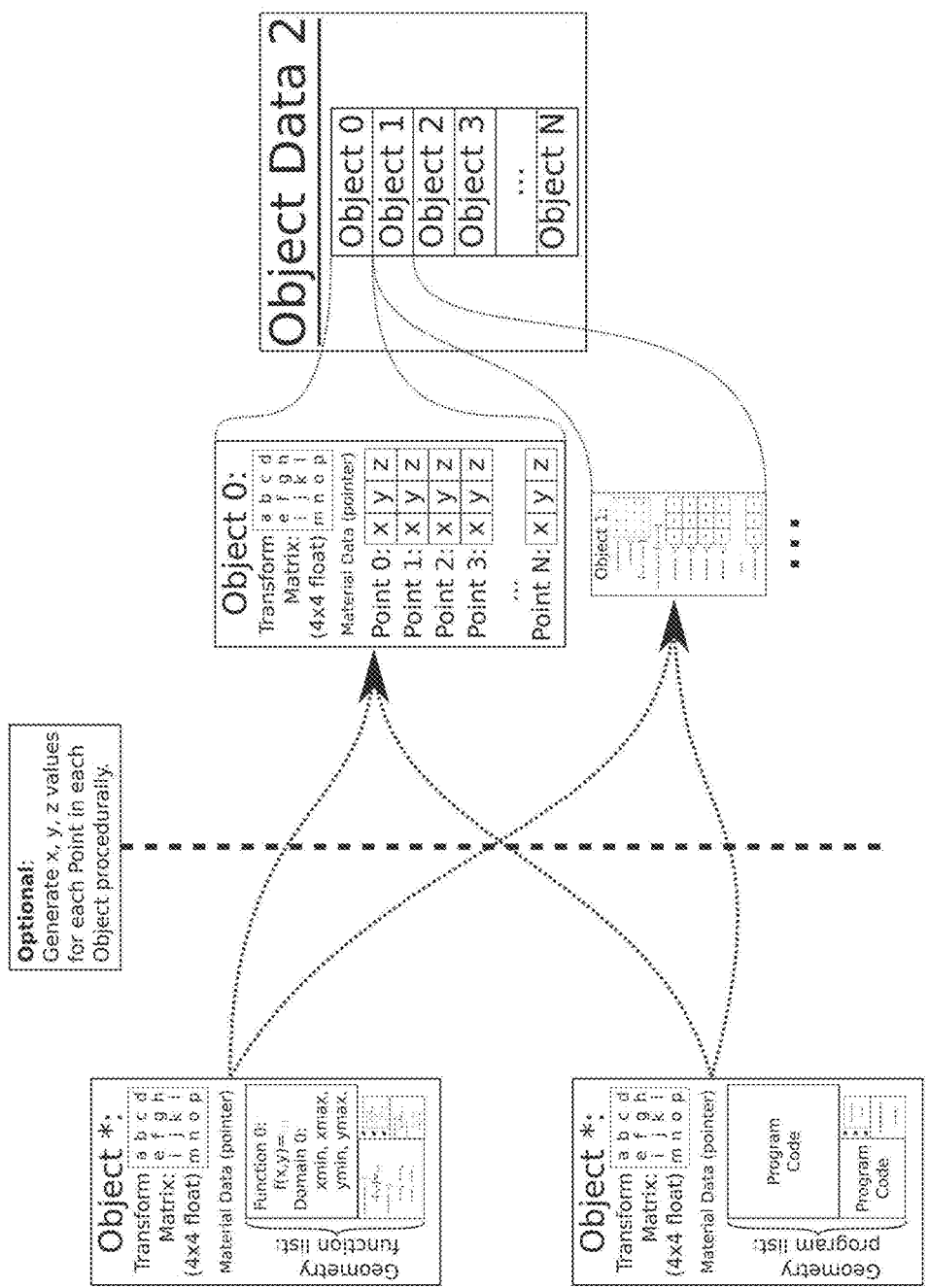
FIG. 3 is a block diagram illustrating an example of object data that may be used in scalable compute image synthesis, in some embodiments.

As illustrated in FIG. 3, the object data 2 (FIG. 1), may include original polygon data, such as triangles or other flat surfaces, which may be represented as a series of XYZ points. For instance, in the case of triangles, the object data 2 may include three XYZ points for each of the one or more triangles forming each polygon and the one or more polygons forming each object. Furthermore, in some examples, the object data 2 may also include additional information such as matrix data for spatial transformation(s) in addition to references linking polygon data to material data (in order to associate surfaces with their respective material properties indexed in material data 3).

Figure 4:
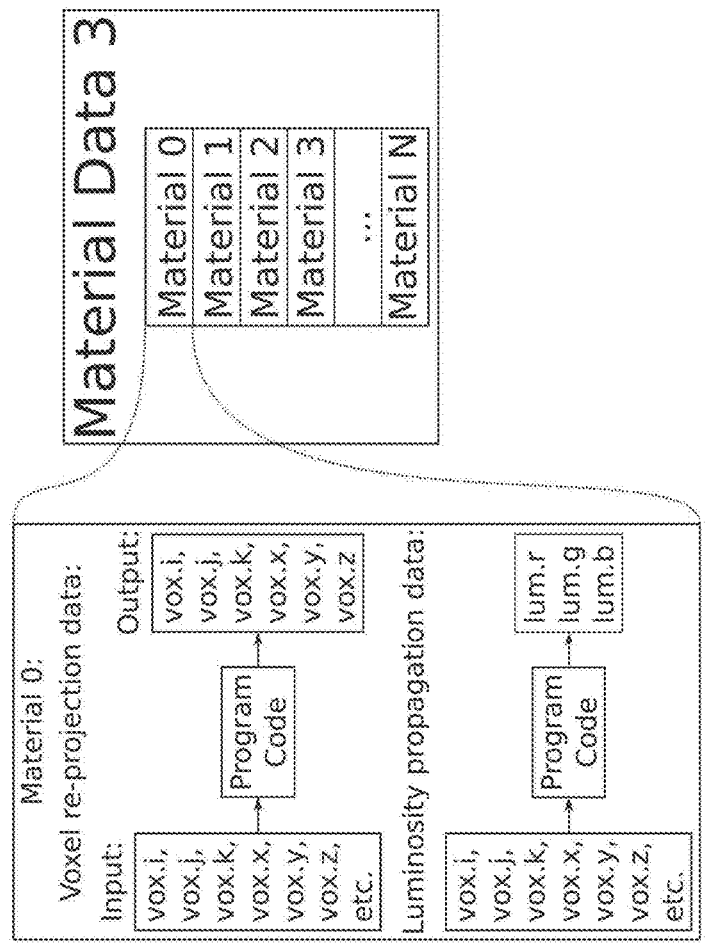
FIG. 4 is a block diagram illustrating the material data that may be used in scalable compute image synthesis, in some embodiments.

Referring to FIG. 4, the material data 3 (FIG. 1) may include program instructions that are used to generate an output voxel from an input voxel (e.g., to generate IJK and XYZ information from input IJK and XYZ information and/or other relevant data). The material data 3 may also include program instructions that describe how a surface will propagate light toward the camera. In some examples, the program instructions may be simple mathematical expressions representing effects such as incident reflection, refraction, diffusion, etc. In other examples, more powerful (e.g. Turing complete) program instructions may be crafted to visually simulate specific material effects (e.g. realistic, artistic, etc.).

Figure 5:
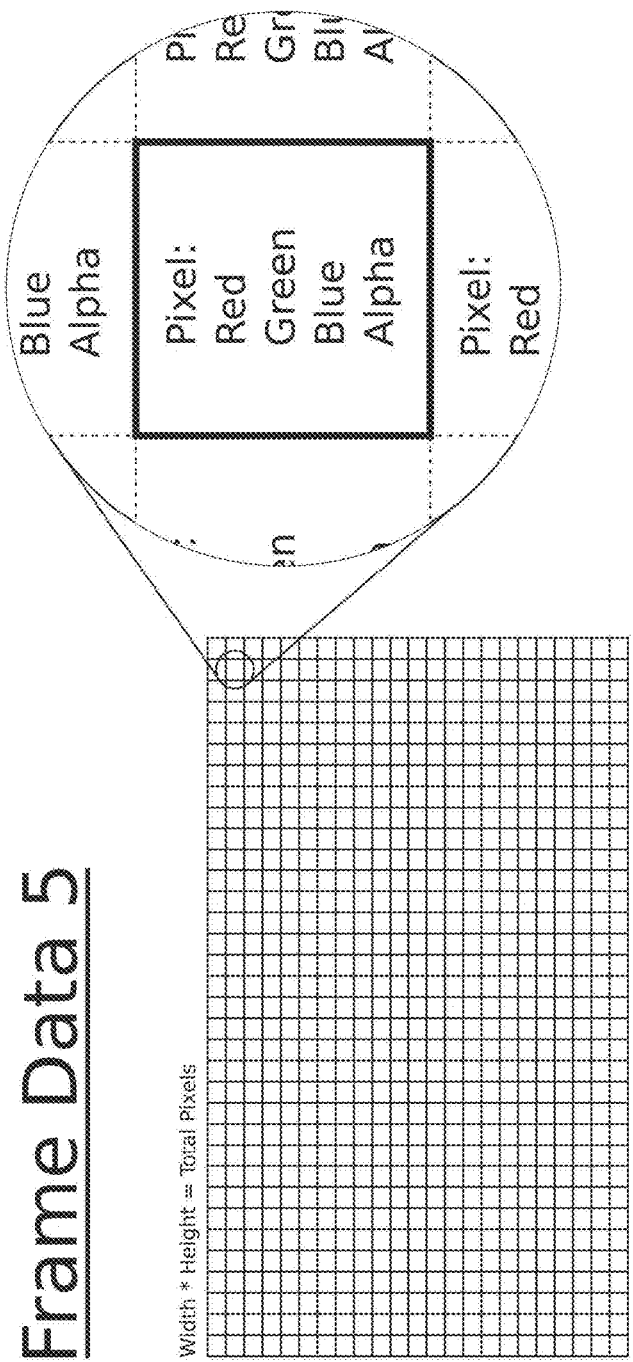
FIG. 5 is a block diagram illustrating an example of frame data that may be generated by performing the operations of the device 150 of FIG. 1, in some embodiments.

FIG. 5 illustrates frame data 5 (FIG. 1), which in some examples may be organized as a linear array of color values (e.g., red, green, blue) and/or transparency values (e.g., alpha). The computing device may select values for pixels for an image based on the aggregated luminosity values computed by the device. The computing device may generate frame data 5 based on the selected values, and the output may be stored (e.g. image/video file) or copied to another device (e.g. to be displayed on a monitor).

Figure 6:
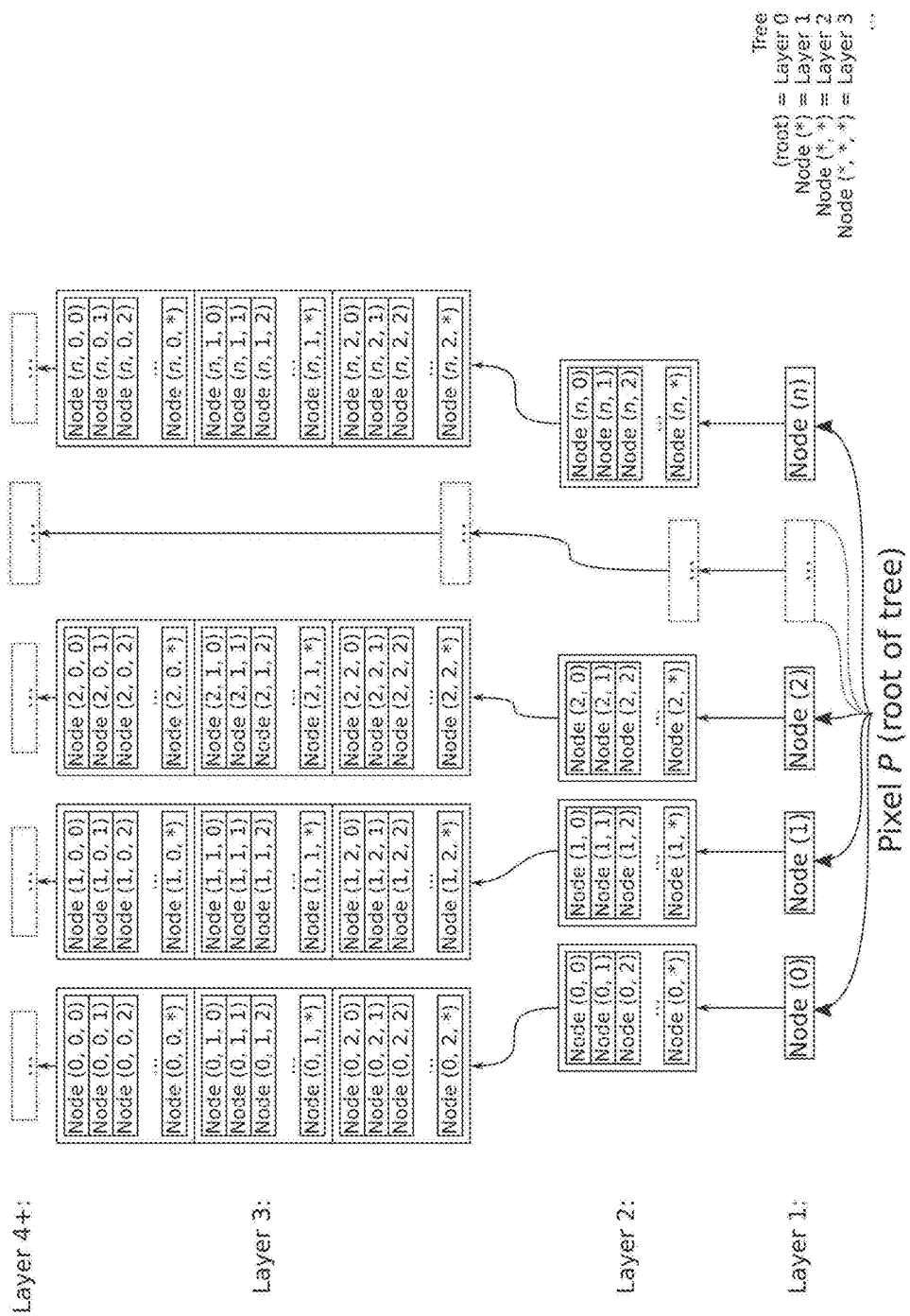
FIG. 6 is a block diagram illustrating a voxel tree data structure that may be generated based on the data of FIGS. 2-4, in some embodiments.

FIG. 6 illustrates voxel tree data, which in some examples may be arranged as a hierarchical structure of data nodes, originating at a first "root" node, where each node may reference zero or more child nodes. Each layer of the voxel tree may represent a projection and an intersection between the projection and the object data 2 in a scene. The first layer of the voxel tree may be generated directly from camera data 1.

Referring again to FIG. 1, in some embodiments, the input may optionally include a configuration value 4. In some examples, the configuration value 4 may indicate a default value for a non-default parameter such as a recursion count or a value for a parameter such as a real-time deadline. In some examples, a recursion count of a value of eight may command the computing device 150 to simulate eight "bounces" of light in a scene. In other examples, the configuration value 4 may be an amount of time (say 1/60th of a second) from which the computing device 150 may identify an appropriate recursion count value (e.g., based on run-time profiling) or simply to terminate further recursion (e.g., once the time limit, deadline, etc. is exceeded) and perform rasterization by selecting color values for pixels based on the available data in the voxel tree.

Although the camera data 1, the object data 2, and the material data 3 may include discrete scalar, point, and/or vector data in some examples, in other examples the input may include functions or program instructions to generate device input data parametrically or procedurally. Continuous functions and/or Turing-complete programs may be used to generate the vectors constituting camera data 1, the points and attributes constituting object data 2, and the interaction properties constituting material data 3. A partial or complete set of input data may be generated by the computing device 150 using such functions.

Figure 7:
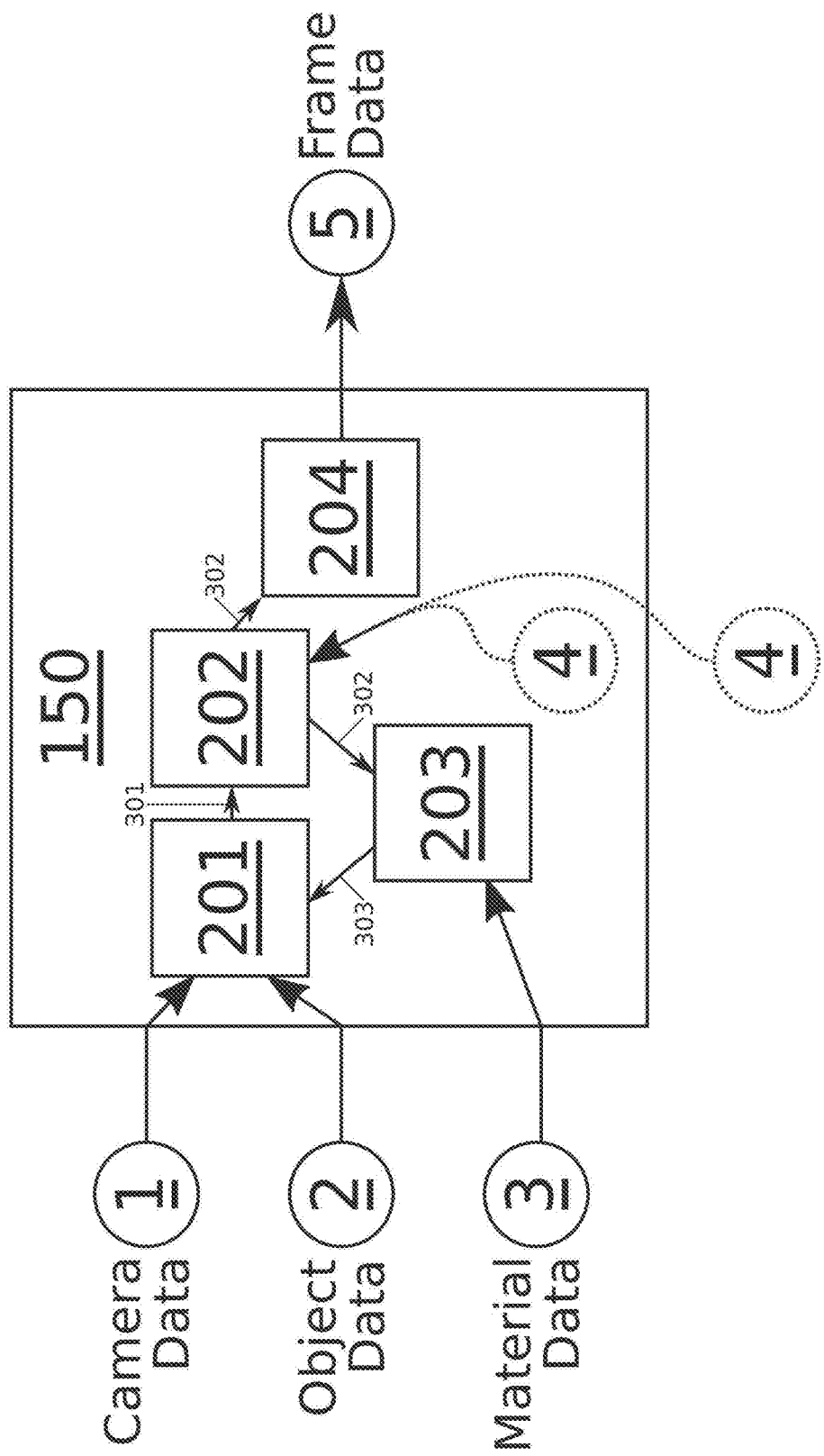
FIG. 7 is a block diagram of the computing device of FIG. 1, in some embodiments.

FIG. 7 is a block diagram of the computing device 150 of FIG. 1, in some embodiments. The computing device 150 may include modules 201-204 to construct a portion 301 of voxel data, a fully-processed voxel tree 302, and subsequently individual pixel values of frame data 5. The recursion count (of the configuration value 4, FIG. 1) may indicate a number of loops through modules 201-203 (for which each loop through the modules 201-203 may generate a new layer of the voxel tree 302 from the previous layer, with a complete tree including a single "root" layer and a partial layer generated by visible objects if no loop is performed to a two-layer tree from the "root" layer and a single recursion of light after the first loop to a multi-layer tree with an nth, deepest layer after the last processed loop). The module 204 may traverse the voxel tree 302 (e.g., depth-first in order to propagate optical luminosity down the tree toward the root node) to identify the value of a pixel of the frame data 5 (FIG. 1). In some embodiments, modules 201-204 may correspond to a different portion of scalable compute image synthesis instructions to be executed by one or more processors (e.g., the same or different processors and/or the same and/or different processor components such as different cores of a multi-core processor).

Referring to FIG. 7, module 201 may generate the voxel data 301 from either camera data 1 or a portion 303 of the voxel tree 302. The module 202 may receive voxel data 301 from module 201 to perform depth occlusion culling. The module 202 may test the recursion count and determine whether to output to module 203 (where more layers of the voxel tree 302 may be generated and processed), or output to module 204 (where the voxel tree 302 may be processed to generate frame data 5).

Figure 8:
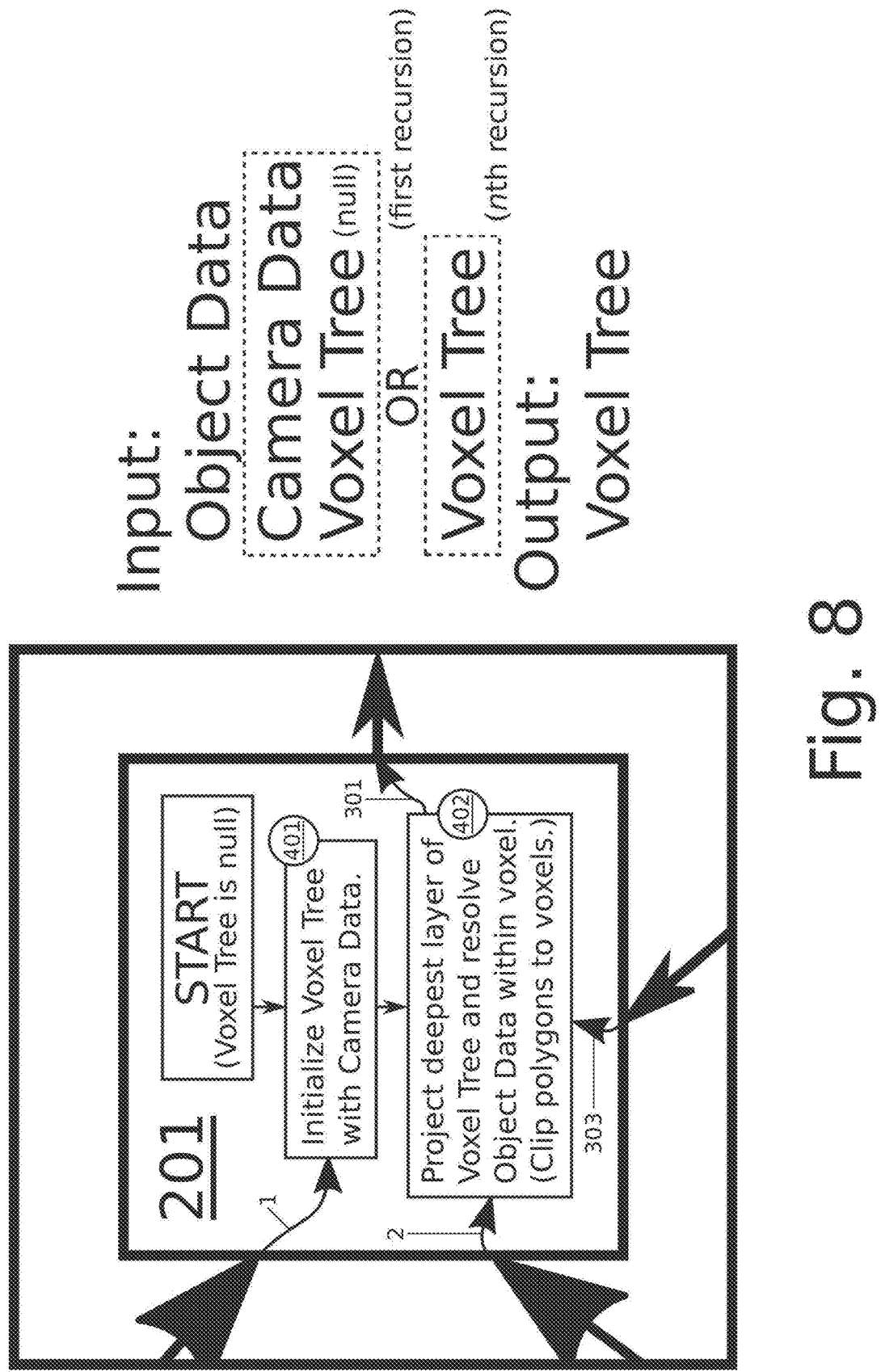
FIG. 8 is a flow chart illustrating operations that may be performed by a module of the computing device of FIG. 7, in some embodiments.

Referring to FIG. 8, the module 201 may identify voxel data 301 (e.g., data for constructing one or more layers of the voxel tree 302) based on comparisons of the object data 2 to a reference, such as the deepest layer of a current portion 303 of the voxel tree 302. In some examples, identifying the voxel data 301 may include deriving voxels based on a reference (e.g., the camera data 1 on an initial loop or the current portion 303 of the voxel tree 302 on a subsequent loop from module 203). Before an initial loop, the voxel tree 302 may be null. In an initial loop, for example in operation 401, the module 201 may initialize the voxel tree 302 with camera data 1 (e.g., generate an initial layer of the voxel tree 302 and/or a portion thereof). In the case of subsequent loop(s), each loop through the module 201 may reference the deepest available layer of the voxel tree 302 (e.g., current portion 303 generated by module 203) and use it to resolve object data within a voxel (e.g., clip polygons to a volume). The module 201 may provide the voxel tree data 301 to the module 202.

The module 201 may identify voxel data 301 by clipping object geometry to within a known space (e.g., geometry from object data 2 is clipped to within an initial projection of the camera data 1, or geometry from object data 2 is clipped by the re-projected portion 303 of the voxel tree 302 from module 203; operation 402). For instance, the module 201 may use binary spatial partitioning to identify whether points of a polygon (e.g., from the object data 2) are inside or outside each edge of the identified voxel (e.g., initial camera voxel data or the current portion 303 of the voxel tree 302 from a previous loop). If the polygon is entirely inside the voxel, the module 201 may include the unmodified polygon in the list of intermediate voxel data 301. If the object is entirely outside any edge of the voxel, the module 201 may omit the polygon from the list. If a portion of the polygon is inside an edge of the voxel and a portion of the polygon is outside the voxel edge, the module 201 may identify the subset of the polygon that is inside the voxel, include it in the list, and omit the remainder. The module 201 may identify a new polygon based on points from the original polygon and points generated (e.g., from planar intersections between the polygon and the edges of the voxel) and may include the new object in the list. This list may be included in output 301 to be processed by module 202.

Figure 9:
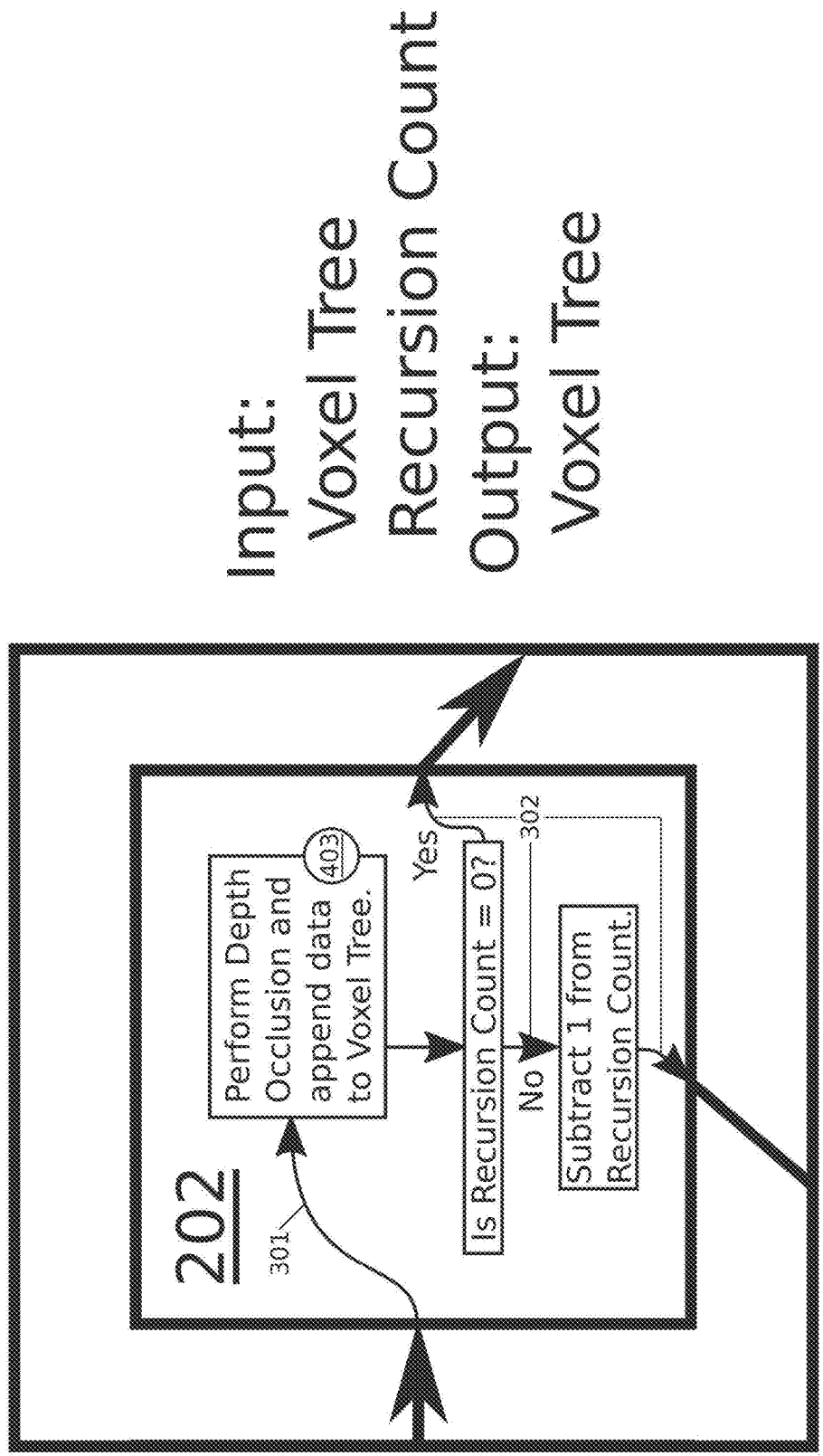
FIG. 9 is a flow chart illustrating operations that may be performed by another module of the computing device of FIG. 7, in some embodiments.

Referring to FIG. 9, the module 202 may perform depth occlusion on the list of objects of the voxel data 301 (operation 403) and generate a substitute layer to be used in the voxel tree 302 with the results of this occlusion process.

In some examples, this may include adding or removing one or more points to/from the list of the voxel data 301. In some examples, the module 202 may check whether any objects of the list are occluded by other objects based on voxel data 301.

As illustrated by FIG. 9, the module 202 may receive as inputs the voxel data 301 and a recursion condition of the configuration data 4. The recursion condition may be a comparison to a count value which may be a positive integer and may be a user input (e.g., a dynamic setting) or an initial value (e.g., a default), in some embodiments. The module 202 may output the voxel tree 302 for re-projection by module 203 or for pixel value selection by module 204. If there are no remaining loops (e.g., a recursion count is equal to zero, the frame deadline has passed, etc.), then the module 202 may perform depth occlusion, generate the last layer of the voxel tree 302, and pass the completed voxel tree to module 204. If there is a loop remaining, the module 202 may perform an operation (e.g. decrement the recursion count) and provide the voxel tree 302 to module 203.

Referring to FIG. 7, the module 203 may receive as input the voxel tree 302 and the material data 3 and provide as output to module 201 a portion 303 of a new layer of the voxel tree 302.

The module 203 may use the deepest layer of the voxel tree 302 along with corresponding material data 3 to generate a new portion 303 of the voxel tree 302. The module 203 may provide the portion 303 of the voxel tree 302 to the module 201.

The module 203 may use the program instructions of the material data 3 and any relevant data as input for said program instructions (e.g. voxel tree 302, material data, temporary variables, etc.) to compute new vectors that constitute the bounds of a new layer of output voxels (operation 404) and append the newly generated layer, where appropriate, to the voxel tree 302 as portion 303.

Referring again to FIG. 7, after the loop is complete, the module 204 may receive the voxel tree 302 and output frame data 5 as an array of pixels (e.g. a bitmap, image file, direct memory such as a frame buffer, etc.) based on the voxel tree 302. In some embodiments, a pixel's color depth may be represented as a number of bits for specific color channels. For example, 24 bits per pixel may allocate 8 bits for red, 8 bits for green, and 8 bits for blue, whereas 10 bits per color requires 30 bits per pixel to represent. Additionally, 32-bit color may use 24 bits for color data and include an extra 8 bits for alpha transparency. The value calculated in the module 204 may be derived from the total aggregated luminosity propagated throughout a voxel tree and terminating in a value indicating the luminosity transported back to the pixel.

Figure 11:
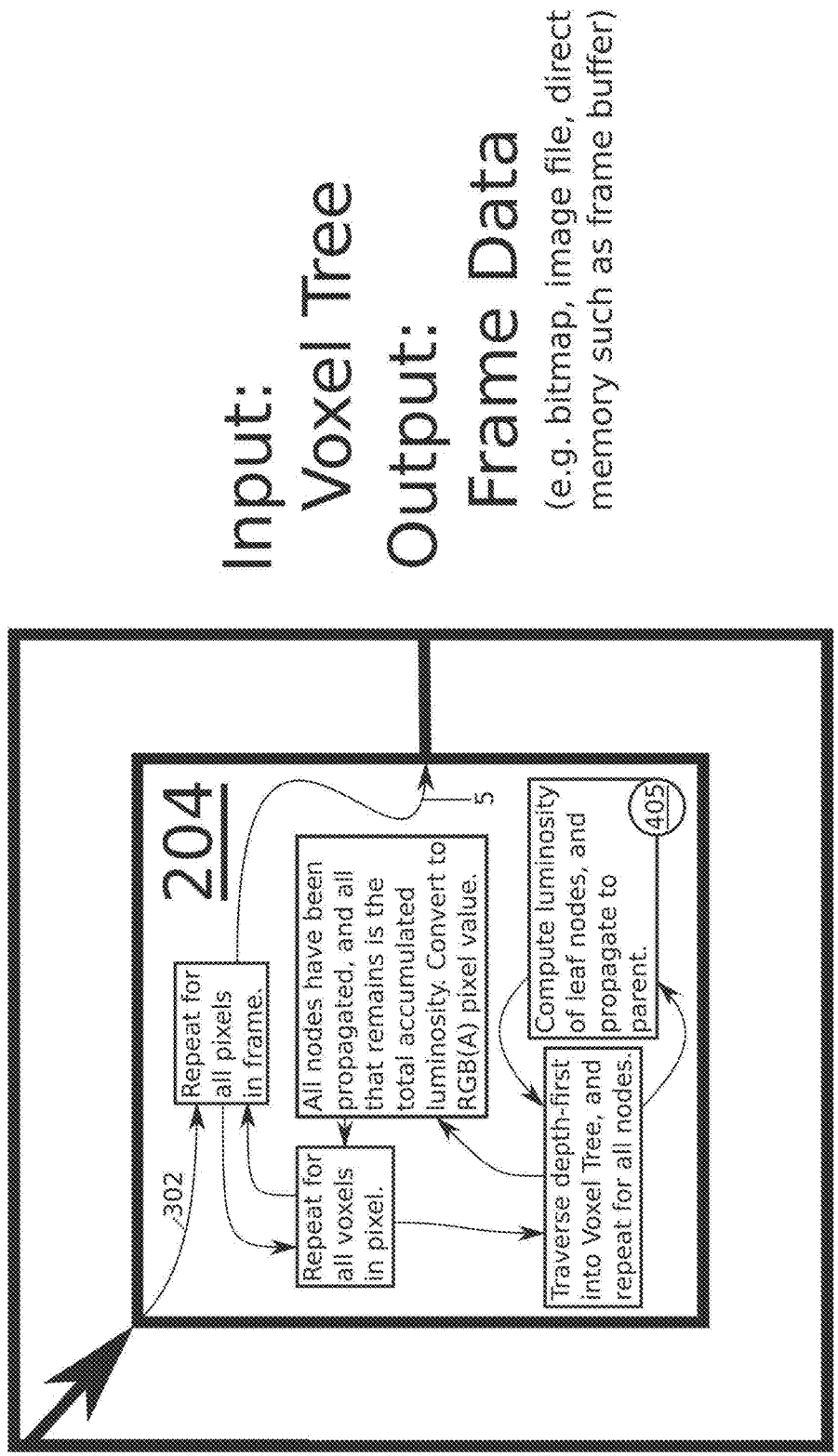
FIG. 11 is a flow chart illustrating operations that may be performed by yet another module of the computing device of FIG. 7, in some embodiments.

Referring to FIG. 11, the module 204 may traverse depth-first into the voxel tree 302. The module 204 may determine the area of a node of the voxel tree 302 (e.g., the area of a polygon identified by the XYZ positions of a voxel's corner vectors, by the position of XYZ+IJK points from a voxel's corner vectors, or by the points of a polygon following clipping and/or depth occlusion operations, etc.) and compute the modeled light it emits (e.g., RGB luminosity). Since the root of the voxel tree represents the collection of light in a modeled camera, if a node is not the root, then the modeled light it emits may be propagated one layer down the voxel tree to its direct parent. This simulates the total propagation of light as the aggregation and manipulation of sequential propagations.

In order to compute the luminosity of a voxel (operation 405), it must have no children or the children it does have must have already been processed (postorder depth-first traversal) and their luminosity propagated as input to the current node. A node with no children to process is considered a leaf node of the tree structure. Postorder traversal determines that all children must be processed before the current node can be completed, so traversal inevitably treats all nodes similar to leaves at some point. In processing a node that is a leaf, there will be no propagated luminosity values from deeper projections or intersections, so the material properties will be used with a limited set of input data. In processing a node that is not a leaf, there will be propagated luminosity values from child nodes, and the material properties may be used to manipulate the inputs in any desired way. Computed luminosity values corresponding to direct children of a node may be used as input data and modified by program instructions in the material data 3 before being aggregated and propagated to the current node. The area of the node (e.g., the area of polygon(s) identified following clipping and occlusion operations, for instance "A front B" in FIG. 13) may be used with the material data 3 to compute the total luminosity generated by a surface. The total luminosity generated by a surface may be combined with the luminosity propagated from child voxels as dictated by the program instructions in the material data 3. This combined luminosity constitutes the total aggregated luminosity of the current node.

When all children of a node have propagated their luminosity to their parent node, the individual values and/or the aggregate summation of values may be modified by the material data 3 associated with the parent node. If a node has a parent (i.e., node is not the root of the tree), then the aggregated (and modified) luminosity value is propagated toward the root. If a node does not have a parent to further propagate luminosity, then the node is the root of the voxel tree, and the luminosity may be converted to a pixel value (e.g., RGB(A) data) and stored in the frame data 5. In some embodiments, the luminosity may be propagated in its entirety. In other embodiments, an artist may craft a function or procedure to interpret luminosity and produce frame data 5 after further calculation (e.g., post-processing, color correction, etc.).

Figure 12:
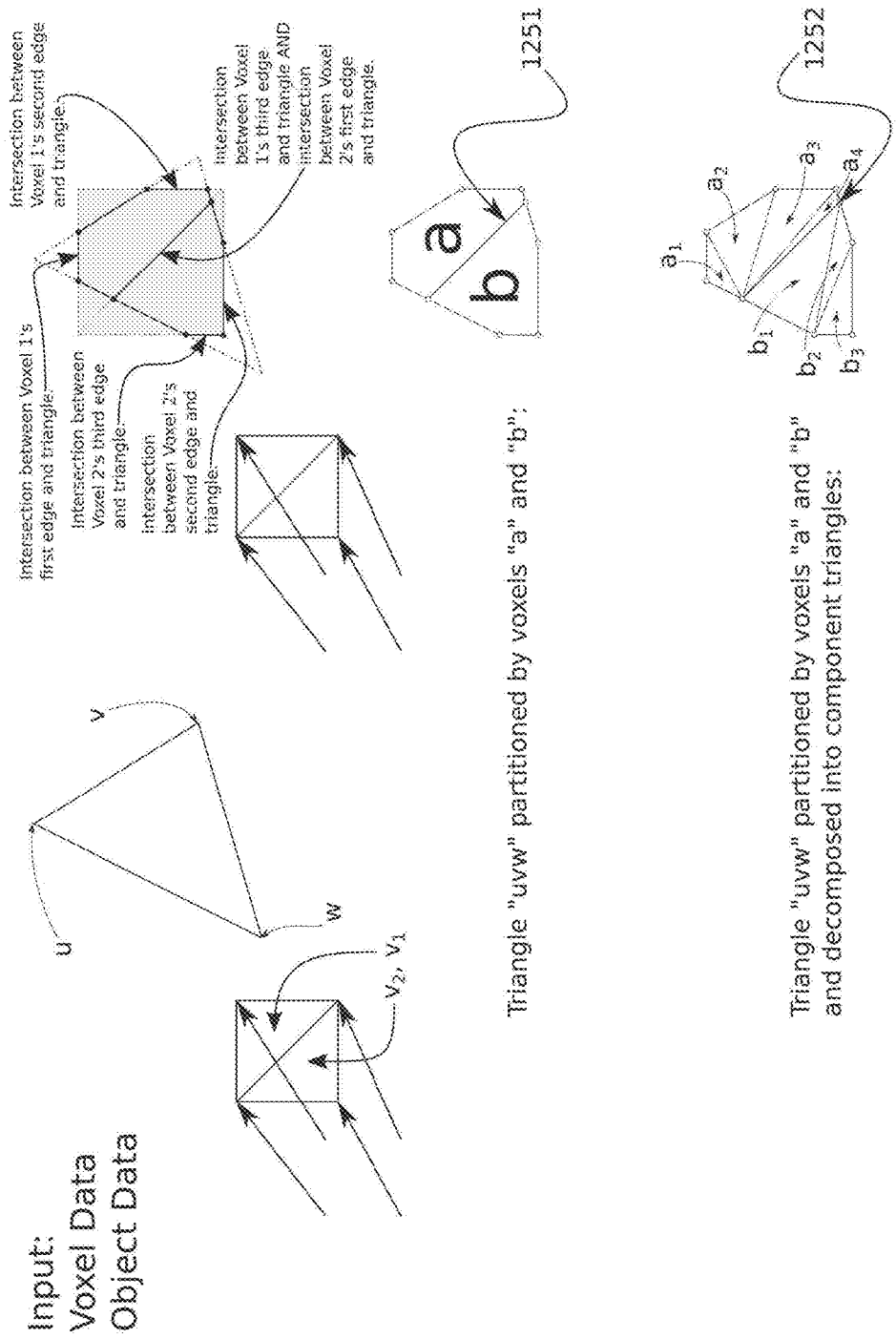
FIG. 12 is block diagram illustrating identification of voxel-polygon intersection to generate new layers of the voxel tree structure in FIG. 6, in some embodiments.

FIG. 12 illustrates operations that the computing device may perform to determine a polygon that represents a triangle (for example, uvw in FIG. 12) that has been clipped (geometrically isolated) to within the volume projected by $p_1$ and $p_2$. The process of clipping a triangle may result in a polygon identical to the original input triangle (if the input triangle is already within the voxel, it will be retained without modification), a polygon subset of the original input triangle (if any parts of the input triangle lie outside of the voxel, they will be iteratively removed using binary spatial partitioning, and the remaining polygon will be included), or no polygon at all (if the input triangle lies completely outside any edge of the voxel, then the triangle will be omitted).

Figure 13:
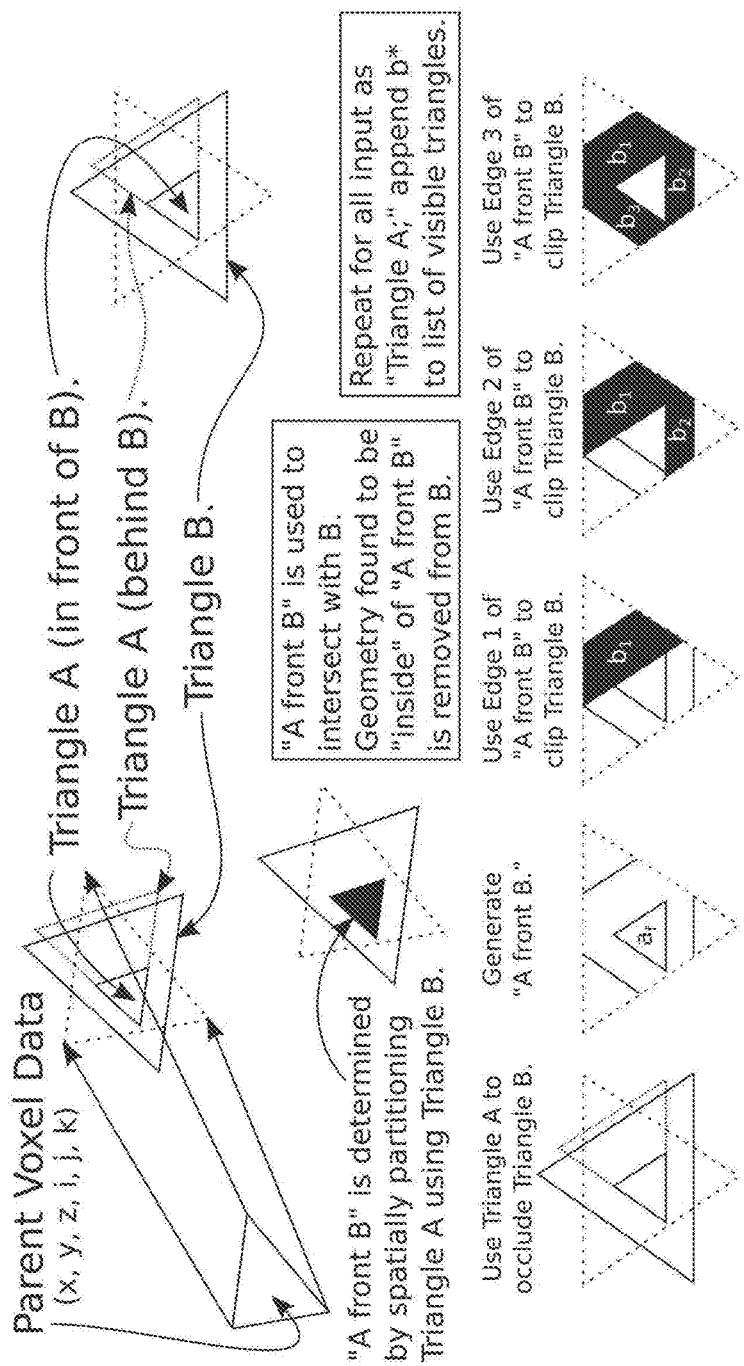
FIG. 13 is a block diagram illustrating identification of visible object depth occlusion as it applies to the voxel tree structure in FIG. 6, in some embodiments.

FIG. 13 illustrates operations that the computing device may perform to check for depth occlusion between objects (e.g., objects that intersect or overlap) and cull intermediate data to produce a layer of the voxel tree 302 in which object visibility based on depth occlusion is calculated.

Referring again to FIG. 13, if any points of triangle A are in front of triangle B, then the computing device may determine the portion by spatially partitioning triangle A using triangle B and retaining the portion of triangle A that exists on the same side of the spatial partition as the parent voxel (here referred to as "A front B"). The computing device may then use polygon "A front B" to identify a portion of triangle B to be culled (e.g., geometry found behind "A front B", with respect to the parent voxel data). The computing device may use the vectors of the parent voxel data and the polygon "A front B" to identify points that are a backward projection of polygon "A front B" that lies on the polygon comprised of the parent voxel's XYZ positions). The points identified as a result of backward projection may be used with the polygon "A front B" to identify vectors of a voxel that represents the projection of the parent to polygon "A front B," herein voxel "A front B" The computing device may use any/all edges of the voxel "A front B" to clip triangle B, as illustrated, in a manner similar to FIG. 12. The results of occlusion include any geometry that is not considered "behind" other geometry in the layer of the voxel tree. This process may be repeated for all polygons in object data 2 to use any "front" portions to occlude overlapped "back" portions of triangle B. This process may then be applied to all polygons in the object data 2, allowing all polygons (except self) to determine all "front" portions and remove any portion of each polygon that is occluded by a "front" portion.

Figure 14:
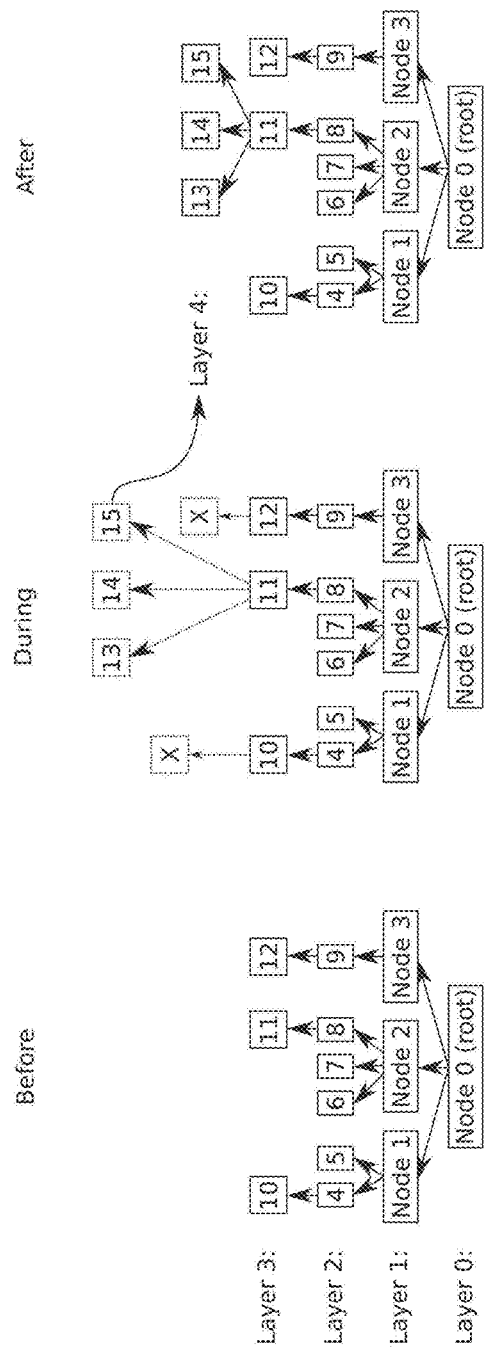
FIG. 14 is a flow chart illustrating generation of a new layer of the voxel tree structure of FIG. 6, in some embodiments.

FIG. 14 illustrates operations that the computing device may perform to progressively generate new layers of the voxel tree. A voxel tree may terminate in nodes with no children ("leaf nodes"). Leaf nodes may terminate for a number of reasons, including if the re-projection (and/or subsequent clipping) results in no intersections with any objects, if a computation involving the recursion count of configuration value 4 prevents further re-projection, if a computation results in an error, etc.

Figure 10:
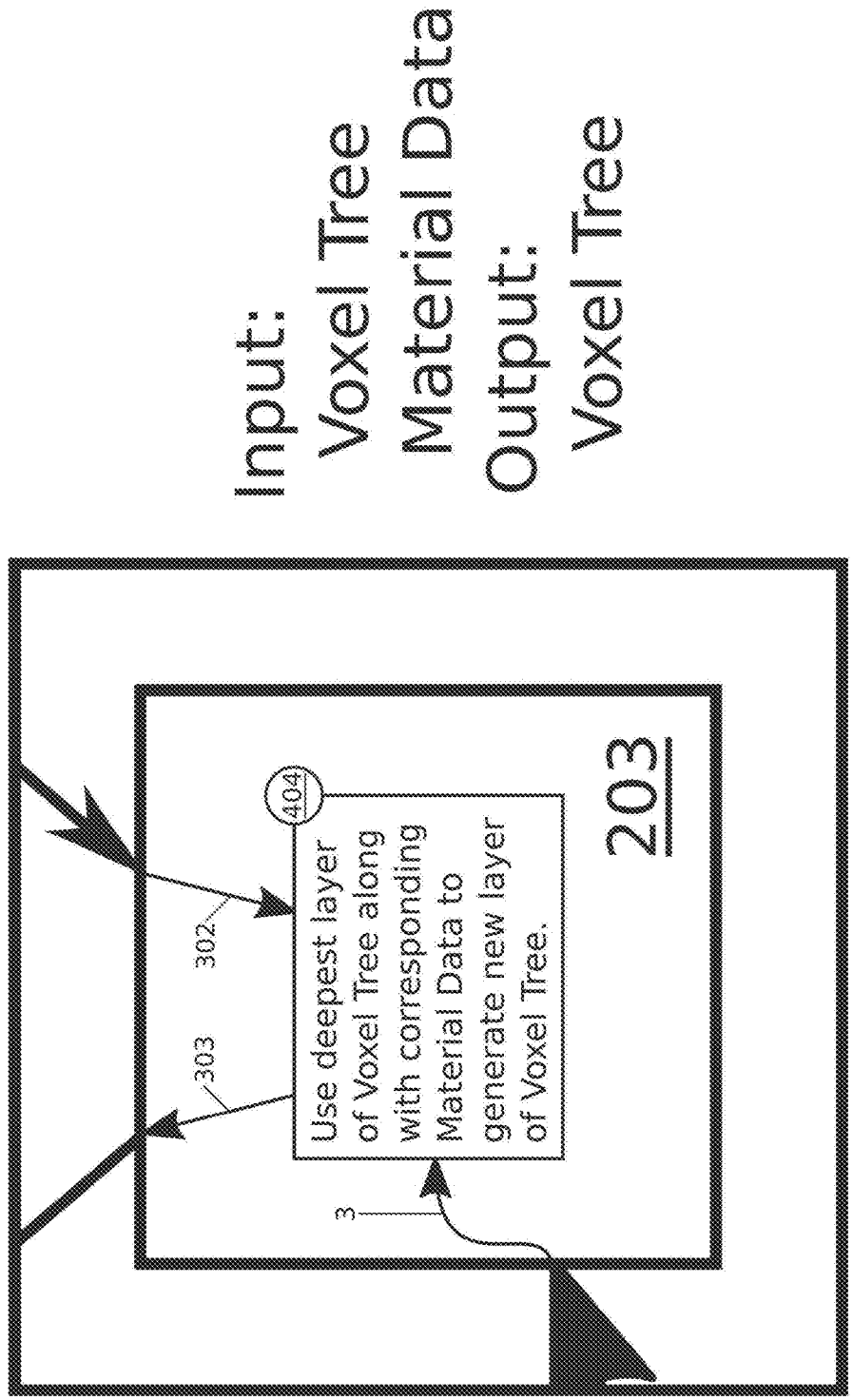
FIG. 10 is a flow chart illustrating operations that may be performed by yet another module of the computing device of FIG. 7, in some embodiments.

Referring to FIG. 7, FIG. 10, and FIG. 14, the module 203 facilitates re-projection of voxel data stored in the voxel tree 302 received as input from module 202. The module 203 may identify existing leaf nodes of the voxel tree 302 that have not been re-projected and use them to generate new child nodes. New child nodes may be populated with voxel data generated using the leaf node's voxel data and the material data 3 associated with the surface of an object to generate vectors of the voxel data to store in the new children. The voxel data of the children is then further processed by other modules. As an example, referring to FIG. 14, node "10" in "Layer 3" is a leaf node whereupon processing does not yield any children with intersections (termination marked with "X"), but node "11" yields children that do intersect object surfaces. If the device continues to loop, then nodes "13," "14," and "15" might also produce children that identify intersections, and so on.

FIG. 15 illustrates operations that the computing device may perform to progressively aggregate, propagate, modify, and ultimately collect luminosity toward the root of the voxel tree. The aggregated and propagated luminosity is modified (1551) by the material properties associated with the surface (e.g. material data 3) that constitutes the boundary between layers of the voxel tree (e.g. the surface that a parent node intersected when it was projected and clipped to generate the child node). This process is applied first to leaf nodes of the voxel tree and then downward to the parents and grandparents and so on. The processing loop terminates when all luminosity data is propagated all the way down the tree to the root. When only the root contains luminosity values, the values may be converted into equivalent values for the color space of the output target (e.g. image file, frame buffer, etc.). Once the final pixel values are selected, the voxel tree may be destroyed.

FIG. 16A is pseudocode of a main function 1600 that may be used in some embodiments of scalable computer image synthesis. The main function 1600 calls process voxel function 1601, solve pixel function 1602, and display bitmap function 1603. The display bitmap function 1603 may use any known pseudocode for displaying a bitmap (including storing it for later use).

FIGS. 16B-C is pseudocode of the process voxel function 1601 called by the main function 1600 of the pseudocode of FIG. 16A. This function is recursive, and may call itself with one of the input parameters being a child node of the node that was being processed when the recursive function call was made. This recursive execution will terminate under normal conditions when the recursion count is zero or if there are no children to process, but it may also terminate in other conditions (e.g. real-time deadline exceeded, critical processing error, etc.). In this function, a test is performed, and one of two things happens: if the current node has already been processed, then the function will be called recursively on all children of the current node, or if the node has not been processed, then the portion 303 of the voxel tree 302 may be projected against object data 2, intersected results may be stored as a new layer of the voxel tree 302, and the function may call itself with a modified recursion condition (e.g. a decremented count). This process ensures that each time process voxel function 1601 is called, the voxel tree 302 may be traversed to the deepest layer and processed to generate a new layer, and generation of new layers eventually halts. In some embodiments, the function IsProcessed( ) may be any code to determine whether the node has already been processed by a loop through the modules.

FIG. 16D is pseudocode of the solve pixel function 1602 called by the main function 1600 of the pseudocode of FIG. 16A. This function calls a recursive function 1611 to propagate the total luminosity in the voxel tree 302, and when the recursive function 1611 is complete, all that is left is luminosity collected by the root node. At this point, the total luminosity may be converted into values relevant to the display or image format.

FIG. 16E is pseudocode of the recursive function 1611 (e.g., a propagate luminosity function) initially called by the solve pixel function 1602 of the pseudocode of FIG. 16D. This recursive function 1611 may call itself a number of times based on the input. One of the parameters of this function is a reference to a single child node of the parent node that was being processed at the time that the recursive function 1611 call was made. At a leaf node, where there are no children to process, no further recursion may be done, and the function call may propagate light emitted by the surface and exit. As recursive calls exit, luminosity calculated for the current node and nodes that have already been processed by other levels of recursion may be propagated to their parent node.

FIG. 16A-E references functions for clipping triangles (e.g. ClipTriangleToVoxel), performing depth occlusion (e.g. OccludeVoxels), setting pixel values (e.g. SetPixel), and computing the area of a polygon (e.g. SolveArea). Triangle clipping is illustrated in FIG. 12 and described in the preceding text. Depth occlusion is illustrated in FIG. 13 and described in the preceding text. Setting pixel values may use any known pseudocode for interacting with bitmap data. Determining the area of a polygon may also use any known pseudocode. As an example, item 1252 of FIG. 12 may be used as an example to decompose a polygon into triangles, and their individual areas may be computed and summed to return a value for the area function.

EXAMPLES

Example 1 is an apparatus, comprising: a memory having instructions stored thereon; and a processor to execute the instructions stored in the memory to: identify input data including camera data and object data; identify voxels based on the input data, each voxel comprising a volume defined based on a plurality of vectors from one or more camera points of the camera data; form a list of objects based on comparisons of the voxels and content of the object data or data derived from said content; construct a voxel tree based on the input data and configuration parameters; identify luminosity of visible geometry within a voxel; aggregate, modify, and propagate data throughout the voxel tree in order to identify a pixel value; select values for pixels of an image based on the propagated luminosity at the root of the voxel tree structure; and store the selected values in an electronic storage or cause the image to be displayed on an electronic display (e.g. monitor, projector).

Example 2 includes the subject matter of example 1 (or any other example herein), wherein the processor is further to: check whether any objects of the list are occluded by other objects of the list based on the one or more points of the voxel tree data; and construct a substitute layer of the voxel tree responsive to results of the check.

Example 3 includes the subject matter of any of examples 1-2 (or any other example herein), wherein the voxel tree comprises a parent layer and any number of child layers, and wherein constructing the voxel tree based on the list of objects further comprises: constructing the parent layer responsive to said comparisons; and constructing each child layer of the any number of child layers using material data of the input data and a most recently constructed layer of the voxel tree.

Example 4 includes the subject matter of any of examples 1-3 (or any other example herein), wherein the data derived from said content comprises axis aligned bounding boxes.

Example 5 includes the subject matter of example 4, or any of examples 1-4 (or any other example herein), wherein the processor is further to derive the voxel data from the axis aligned bounding boxes.

Example 6 includes the subject matter of any of examples 1-5 (or any other example herein), wherein the processor is further to: identify a plane based on the vectors of a voxel; use binary spatial partitioning to identify points of the object data that are outside the voxel; and responsive to identification of one or more points of the object data inside the voxel, identify a set of points on at least one edge of the plane to define at least one of the objects of the list.

Example 7 includes the subject matter of any of examples 1-6 (or any other example herein), wherein the objects comprise polygons defined by the input data.

Example 8 includes the subject matter of any of examples 1-7 (or any other example herein), wherein the objects comprise three dimensional objects.

Example 9 includes the subject matter of any of examples 1-8 (or any other example herein), wherein the model data comprises at least one three dimensional model.

Example 10 includes the subject matter of any of examples 1-9 (or any other example herein), wherein the image is rendered and displayed in real-time or pre-rendered, stored, and displayed at a later time.

Example 11 is an apparatus, comprising: circuitry to select values for pixels of an image responsive based on input data including camera data and object data, the circuitry to: identify voxels based on the input data, each voxel comprising a volume defined based on a plurality of vectors from one or more camera points of the camera data; form a list of objects based on comparisons of the voxels and content of the object data or data derived from said content; construct a voxel tree based on the list of objects; and use the voxel tree to select the values for the pixels of the image; and output the selected values or cause the image to be displayed on an electronic display.

Example 12 includes the subject matter of example 11, wherein output of the selected values further comprises transmitting the selected values over an electronic network or storing the selected values in an electronic storage.

Example 13 includes the subject matter of any of examples 11-12 (or any other example herein), wherein the circuitry is further to identify a request to render that is received over an electronic network and identifies the input data.

Example 14 includes the subject matter of example 13 or any of examples 11-13 (or any other example herein), wherein output the selected values further comprises response to the request by causing the selected values to be transmitted over the electronic network to cause the image to be remotely displayed.

Example 15 includes the subject matter of any of examples 11-14, wherein the circuitry comprises a processor to execute instructions.

Example 16 is a system, comprising: a computing device to select values for describing a frame of pixels by modeling, based on camera data, object data, and material data, a geometric projection of light in a visual simulation, the computing device comprising: a clipping module to, for each input associated with one or more references, identify a portion of voxel data based on comparisons of the object data to all associated references, in order to generate one or more outputs based on portions of the voxel data; wherein at least one of the one or more references may comprise the camera data; and wherein at least one of the one or more references may comprise object data; and wherein the outputs, based on portions of the voxel data, may comprise a structure of references that may become more complex with each iteration of the clipping module; a depth occlusion module to check for spatial visibility of the one or more outputs of the clipping module, and generate one or more outputs, possibly including one or more layers of a tree of voxel data; a re-projection module to identify a re-projection of voxel data based on the material data and the respective output of the depth occlusion module, to output information about the re-projection layer to the clipping module as one of its inputs, generating structures with individual "root" nodes and generating new nodes with each iteration, constituting a "tree" structure (herein, a "voxel tree"); and a computing device to determine whether each output of the one or more outputs of the depth occlusion module corresponds to a final layer of the voxel tree, or not, and to change the condition following each identification that a respective output of the one or more outputs of the depth occlusion module does not terminate, the computing device further comprising an aggregation module to, responsive to an identification that one of the one or more outputs of the depth occlusion module does correspond to the final layer of the voxel tree, aggregate data of the final layer of the voxel tree with the preceding layers of the voxel tree to select the value of the pixel.

Example 16 includes the subject matter of example 15 or any other example herein, wherein the computing device is to initialize the termination condition for determining if a node is the final layer based on a recursion count value.

Example 17 includes the subject matter of any of examples 15-16 or any other example herein, wherein the termination condition comprises a default value.

Example 18 includes the subject matter of any of examples 15-17 or any other example herein, wherein the termination condition comprises a user defined value.

Example 19 includes the subject matter of any of examples 15-18 or any other example herein, wherein the camera data comprises discrete scalar values of vector data loaded from electronic storage.

Example 20 includes the subject matter of any of examples 15-19 or any other example herein, wherein the camera data comprises a functions and/or programs to be executed to generate discrete scalar values of vector data parametrically or procedurally.

Example 21 includes the subject matter of any of examples 15-20 or any other example herein, wherein to change the count following each identification that the deepest layer of the voxel tree does not correspond to the final layer of the voxel tree further comprises to decrement the count.

Example 22 includes the subject matter of any of examples 15-21 or any other example herein, the computing device further to cause an image to be displayed on an electronic display based on the pixel value.

Example 23 includes the subject matter of any of examples 15-22 or any other example herein, the computing device further to transmit a communication that includes the pixel value over an electronic network or store the selected values in an electronic storage.

Example 24 includes the subject matter of any of examples 15-23 or any other example herein, the computing device further to identify a request to render that is received over the electronic network, the request including the camera data, the object data, and the material data, wherein the communication comprises a response to the request.

Most of the equipment discussed above comprises hardware and associated software. For example, the typical compute device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software, again, is well known. In some embodiments, memory associated with a given processor may be stored in the same physical device as the processor ("on-board" memory); for example, RAM or flash memory disposed within an integrated circuit microprocessor or the like. In other examples, the memory comprises an independent device, such as an external disk drive, storage array, or portable flash memory key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to PROM, EPROM, EEPROM, flash memory, etc. These technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A system, comprising:
a computing device to select values for describing a frame of pixels by modeling, based on camera data, object data, and material data, a geometric projection of light in a visual simulation, the modeling including identifying voxel data and building a voxel tree from the voxel data, the computing device comprising:
a clipping module to, for each input associated with one or more references, identify a portion of the voxel data based on comparisons of the object data to an associated one of the one or more references, to generate one or more outputs based on, respectively, the one or more portions of the voxel data;
wherein at least one of the one or more references comprises the camera data; and
a depth occlusion module to check for spatial visibility of the one or more outputs of the clipping module and generate, respectively, one or more outputs;
the computing device to determine whether each output of the one or more outputs of the depth occlusion module corresponds to a final layer of the voxel tree or not, the computing device further comprising:
a re-projection module to, responsive to each identification that the respective output of the one or more outputs of the depth occlusion module does not correspond to the final layer of the voxel tree, identify a re-projection layer of the voxel tree based on the material data and the respective output of the depth occlusion module, to output information about the re-projection layer to the clipping module as one of said inputs, wherein if the re-projection layer of the voxel tree is identified, at least one different one of the one or more references comprises the information about the re-projection layer; and
an aggregation module to, responsive to an identification that one of the one or more outputs of the depth occlusion module does correspond to the final layer of the voxel tree, aggregate data of the final layer of the voxel tree with preceding layers of the voxel tree to select an individual one of the values.

2. The system of claim 1, wherein the computing device is to initialize a termination condition for determining whether each output of the one or more outputs of the depth occlusion module corresponds to a final layer of the voxel tree or not.

3. The system of claim 2, wherein the termination condition comprises a default value.

4. The system of claim 2, wherein the termination condition comprises a user defined value.

5. The system of claim 2, wherein the termination condition is based on a count, and wherein the computing device is further to change the count following each identification that a respective output of the one or more outputs of the depth occlusion module does not correspond to the final layer of the voxel tree.

6. The system of claim 1, wherein the camera data comprises discrete scalar values of vector data loaded from electronic storage.

7. The system of claim 1, wherein the camera data comprises one or more functions or one or more programs to be executed to generate discrete scalar values of vector data parametrically or procedurally.

8. The system of claim 1, the computing device further to cause an image to be displayed on an electronic display based on the values for describing the frame of pixels.

9. The system of claim 1, the computing device further to transmit a communication that includes the values for describing the frame of pixels over an electronic network or store the values for describing the frame of pixels in an electronic storage.

10. The system of claim 9, the computing device further to identify a request to render that is received over the electronic network, the request including the camera data, the object data, and the material data, wherein the communication comprises a response to the request.

* * * * *